3,121,856
SONAR SYSTEM
William J. Finney, % Naval Research Laboratory,
Anacostia Station, Washington, D.C.
Filed June 29, 1950, Ser. No. 171,171
13 Claims. (Cl. 340—3)
(Granted under Title 35, U.S. Code (1952), sec. 266)

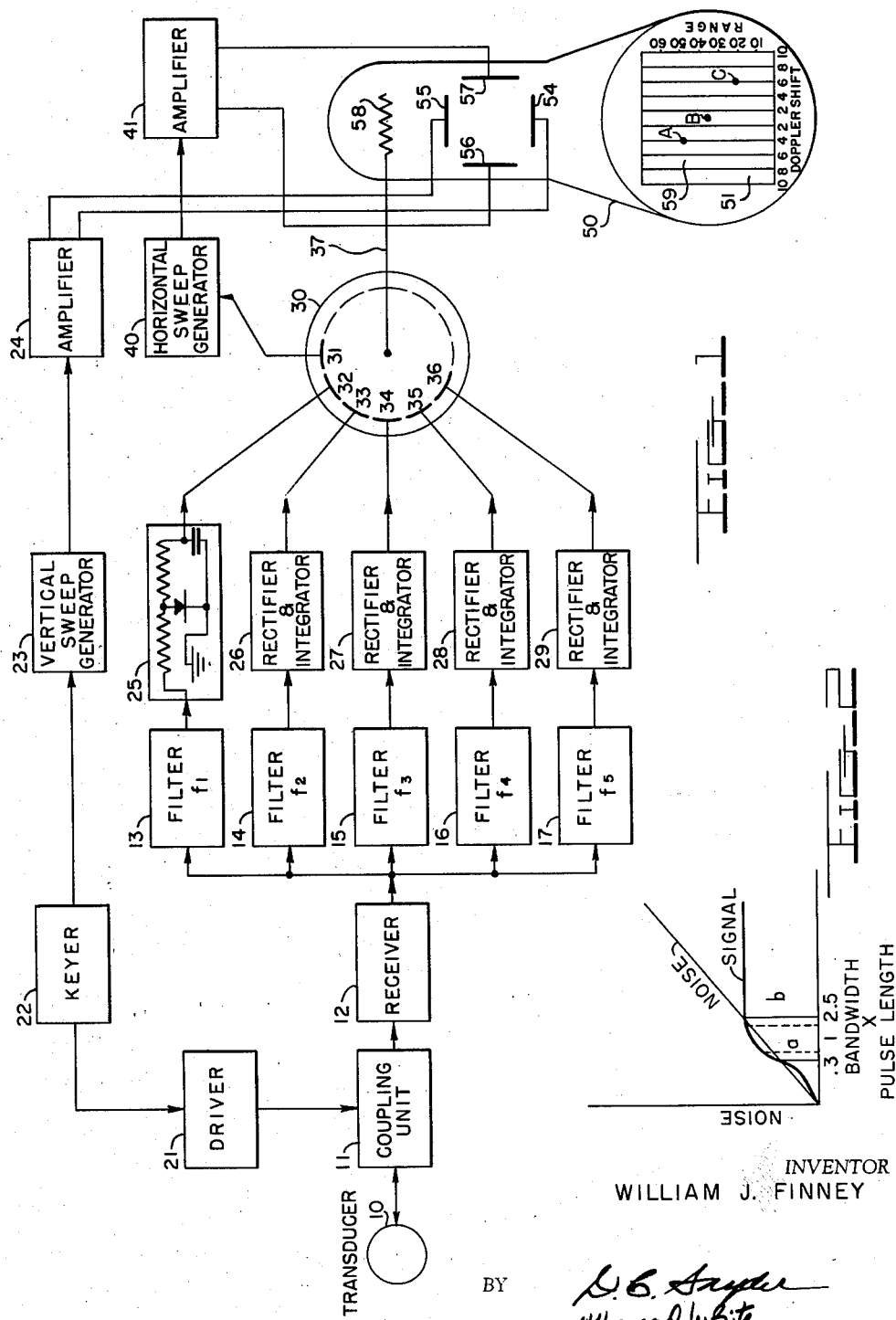

This invention relates in general to a pulse echo signal locator system and in particular to the indication of the range and direction of movement of a detected remote object.

The present invention is described hereinafter as a sonar pulse echo locator system. Although the principles of operation of the present invention lend themselves more readily to sonar and sonar frequencies, they are not to be thusly limited as they are equally as well applicable to radar or any other form of a pulse echo locator system.

The primary function of a sonar pulse echo locator system, as commonly known, is the detection of remote objects totally submerged in a large body of water. There are a number of physical factors present, however, in a sonar system which have the tendency to render the detection of remote objects extremely difficult and to limit to a great extent the maximum range upon which an object may be detected. For the detection of a remote object there must be present in the beam of the sonar transducer some acoustic energy which is due to the presence of the object that is distinguishable from background acoustic energy.

The background contains noise produced by the object itself plus the ambient noise produced by the mass of water. There are also added irregularities that reflect the transmitted energy such as surface and bottom irregularities, marine life, small gas bubbles, thermal structures and many more. This miscellaneous reflection is commonly known to those in the sonar art as reverberation.

Another factor which has a tendency to render the detection of remote objects in water with acoustical equipment difficult, is the loss of signal in the two-way transmission path. Energy loss by two-way transmission includes absorption, divergence and bending of sound beam. The absoprtion loss alone, for instance, is two hundred times greater per mile at sonar frequencies than at radar frequencies propagating into free space. At a sonar frequency of 30 kc. this absorption loss approximates 200 db for a ten mile range. Accordingly, and neglecting all other transmission loss factors, this would require 10,000 volts across the transducer on transmitting to produce a one-microvolt received echo signal from an object ten miles away.

Still another factor present in a sonar pulse echo locator system that has the tendency to render the detection of remote objects extremely difficult under noise-limiting conditions is that the frequencies commonly used in sonar are usually shifted by an unpredictable amount upon reflection from a detected remote object. This frequency deviation, which in certain instances may attain a deviation as much as two percent, is due to the "Doppler effect," the unknown motion of the detected object through the water.

In summary then, there are physical factors present in a sonar pulse echo locator system that offer an extreme amount of background noise, and further there are factors that tend to render the transmitted and received signal extremely weak. The present invention is a new and improved pulse echo locator system designed to greatly increase the signal-to-noise ratio of contemporary locator systems. To accomplish the objective, the present invention employs to its greatest advantage the frequency shift due to Doppler.

In the system of the present invention the reflected echo signals are separated, as fully described hereinafter, with respect to the various frequency components therein, into a plurality of frequency channels having a bandwidth wherein the signal level exceeds that of the noise. These channels are then applied in a unique manner to a cathode ray tube indicator to present thereon, in conjunction with the range of the detected remote object, the actual component of relative movement of the detected remote object along a line connecting the remote object and the detecting equipment (commonly called range-rate).

It is accordingly an object of the present invention to provide a new and improved pulse echo locator system.

It is a further object of the present invention to provide in a pulse echo locator system a method and means of distinguishing signals reflected from a detected object over that of background noise.

Another object of the present invention is to provide in a pulse echo locator system a new method and means of separating a received reflected signal into a plurality of signal channels in accordance with the various frequency components comprised in the received echo signals.

Another object of the present invention is to provide in a pulse echo locator system a new and improved cathode ray tube indicator means.

Another object of the present invention is to provide in an improved pulse echo locator system a new and improved cathode ray tube indicator operable in response to the various frequency components comprising a received echo signal.

Still another object of the present invention is to provide in a pulse echo locator system a new and improved cathode ray tube indicator operable to indicate the range and the direction of movement of a detected remote object.

Other objects and attainments of the present invention will become apparent from the following detailed description when taken in conjunction with the drawings in which:

FIG. 1 is a preferred pulse echo locator system illustrated in accordance with the teachings of the present invention and FIG. 2 is a graph illustrating the signal and the noise levels versus bandwidth of any one of the filters shown in FIG. 1.

In accordance with the spirit and scope of the teachings of the pulse echo locator system of the present invention, periodic impulses are transmitted and the echo signals reflected therefrom are received. These received signals, bearing any of a plurality of frequencies deviating above and below the pre-set transmitted frequency due to the unknown motion of the detected object, are applied simultaneously to a plurality of band-pass filters. Each band-pass filter passes that portion of the received echo signal of the particular frequency to which it is tuned and of a frequency bandwidth in accordance with the signal-to-noise ratio of the spectrum. There is accordingly provided a number of band-pass filters each passing a divisional portion of the received pulse echo energy wherein the signal level exceeds that of the noise. The output of each of the filters is rectified, and integrated in certain instances and applied to an individual contact of a commutating device for sequential delivery to a cathode ray tube indicator.

A cathode ray tube indicator is employed in the system to visually indicate the range, direction, and approximate speed of movement of the detected object. To indicate the range of the detected object the electron beam of the cathode ray tube is swept vertically in synchronism with the emission of an exploratory pulse signal. To indicate the direction of movement of the detected object the electron beam of the cathode ray tube indicator is swept horizontally, as described hereinafter, so to produce one sweep per each cycle of the commutating device. The output of the commutating device, to which the plurality of filters are applied, is coupled to the intensity grid of the cathode ray tube indicator to produce an intensified spot in a horizontal position on the screen corresponding to the particular filter channel from which the signal originates. Since the frequency shift of the received signal, from the frequency of the transmitted signal, is proportional to the movement of the detected object; there is presented on the cathode ray tube indicator screen the intensified spot or spots in a horizontal position indicative of the direction of movement of the detected object.

Referring now in particular to FIG. 1 there is disclosed the teachings of the invention as applied to a sonar pulse echo locator system. Transducer 10 is operative to convert the periodically recurring pulses of electrical energy obtained from the output of the driver 21 into pulses of sound energy, and during reception operates to convert sound energy into electrical energy for delivery to receiver 12.

The coupling unit illustrated at 11, isolates the driver 21 electrically from the transducer during reception intervals and protects the receiver 12 from driver 21 during transmission. Driver 21 is keyed periodically by keyer 22 to produce the periodic pulses for transmission.

Receiver 12 connected to the coupling unit 11 is of conventional design and is operative to receive and amplify the reflected echo signals from the transmitted pulses. As previously mentioned, the reflected echo signals from a moving object will be shifted in frequency from the carrier frequency of the transmitted signal as much as two percent. Receiver 12 then must be sufficiently broadbanded to receive signals of a frequency at least two percent above and below the particular frequency of the pulse transmitted.

The output of receiver 12 is fed to a plurality of bandpass filters illustrated in FIG. 1 as 13 through 17. The number of filters shown is, of course, merely illustrative and any number of filters, as explained hereinafter, may be employed without departing from the spirit and scope of the present invention. It is known that the bandwidth of a filter for optimum transfer of pulse type signals with minimum transfer of noise is approximately the reciprocal of the pulse length. In a sonar system, wherein because of the low velocity of propagation the Doppler shift is a primary factor, a bandwidth of a considerable number of times greater than the optimum is necessary to transfer all the frequency components of reflected echo signals. In general the present invention overcomes this difficulty by employing a plurality of filters each having a different Q factor. More particularly each filter has the above-described optimum band-pass characteristic at a different center frequency, with the center frequencies of the several filters staggered so that the entire group of filters passes the overall frequency spectrum encountered in locator operation. In this manner, maximum signal is obtained with respect to background noise.

More specifically, in operation of the filter system as employed in the present invention, it was found that in an exemplary embodiment at a sonar frequency of 20 kc. the Doppler shift may be as much as 150 cycles per second above or below the carrier frequency, if a maximum target speed of 10 knots is assumed. Thus a bandwidth of 300 cycles per second is required of the receiver. In a typical case, however, the sonar pulse length may be 100 milliseconds and the optimum bandwidth for a receiver of 100 millisecond pulse is of the order of 10 cycles per second.

Referring now for the moment to FIG. 2 there is shown a graph of the output energy level versus bandwidth for a typical filter. As here shown, the noise energy level varies as a linear function of the bandwidth, whereas the peakpower of the pulsed signal varies with bandwidth as shown. From these two representations it is readily seen that the noise level increases so rapidly with respect to bandwidth a single filter to pass the overall spectrum would render the system very inefficient. It has been found, however, that by employing a plurality of filters, each filter having a pass-band designed to pass the maximum signal versus noise as shown between $a$ and $b$, the overall spectrum is covered with a minimum of noise background.

The bandwidth of each filter to pass the optimum signal is determined by minimizing the expression:

$$\frac{KBw}{(1-e^{-\pi BwP})^2}$$

where K is a constant for noise, $Bw$ is bandwidth and P is pulse length and $e$ of course is the Napierian log base. From this equation it may be calculated that a filter having optimum signal to noise characteristics and designed to pass the optimum reflected signal of a one hundred millisecond pulse, should have a bandwidth of less than ten cycles per second, or in general terms, the optimum bandwith is approximately one divided by the pulse length. If then the reflected echo may vary in frequency from that of the transmitted pulse by a total of three hundred cycles per second, a total of thirty filters would be employed, each having a ten cycle per second bandwidth and a 10 cycle per second difference in center frequencies. Each filter would be passing only the noise energy in a band required to pass the signal, and the overall filtering system would be passing the entire frequency spectrum with a signal level above that of noise.

The center filter, which may be represented by filter 15 of FIG. 1 will be tuned in this instance to the carrier frequency of the transmitter. Each of the filters as represented by the two filters 13 and 14 will equally divide that frequency deviation of the echo signals of 150 cycles per second below that of the transmitted pulse frequency. Each of the filters as represented by the two filters 16 and 17 will equally divide that frequency deviation of the echo signals of 150 cycles per second above that of the transmitted pulse frequency. In a constructed embodiment of the present invention a total number of 29 filters were employed, each having a pass-band of 10 cycles. The center filter passing frequencies in accordance with the carrier frequency and 14 filters passing the frequency deviation above that of the carrier frequency and the 14 other filters passing the frequency deviation below that of the carrier frequency. The output of each filter is then applied to commutating device 30 in a manner described hereinafter.

It was above stated that a one hundred millisecond pulse would require a filter having a pass-band of the order of 10 cycles per second to pass the optimum signal, and accordingly to cover a spectrum of 300 cycles per second 30 filters would be employed. It may be desired, however, in certain instances to employ a longer pulse, of say 1000 millisecond duration, which would in accordance with the above equation only require a one-cycle per second pass-band filter. With the above mentioned three hundred cycles per second frequency deviation, it would require the impractical number of 300 filters.

It is easily shown, however, that an appreciable gain in detectability can be achieved, in cases where optimum filtering of the type described above is impracticable, by rectification of the signal and noise, and subsequent integration of the rectified voltages. If for example, a pulse length of 1000 millisecond is used and a 300 cycle band must be covered, a high degree of efficiency may be obtained by the use of 30 ten cycle band-pass filters as described above, each filter being followed by a rectifier and a voltage integrator of the well known RC type, as typified at 25, having a time constant of the order of one second. The loss incurred in this composite filtering method, as compared with the use of 300 filters to provide all filtering before rectification, is dependent upon the ratio of the time constants of the integrators and the band-pass filter. If this ratio is less than two or three the loss is usually negligible. For ratios greater than about 10, the loss becomes quite appreciable.

Thus, in most target location applications it is not desirable to utilize the full number of channels since the increased equipment complexity increases the probability of equipment failure and the difficulty of the field maintenance problem is out of proportion to the increase in the operating efficiency. It is also not desirable to utilize a time constant ratio greater than three or four under ordinary conditions, since the rate of increase in loss becomes quite high in this region.

A typical case which represents a satisfactory design in that little detector loss is incurred, while at the same time the equipment complexity is kept to a minimum, is: a 300 millisecond pulse length; 30 filters each having a 10 cycle wide band-pass spaced over a 300 cycle per second band; each filter followed by a rectifier and an integrating circuit having a time constant of the order of 300 milliseconds.

It may be pointed out here that in certain cases a better use of the filtering principles of the present invention in object location will be achieved if a non-uniform spacing of filters is used. For example, in the case of a reverberation-masked echo from an object which is moving very slowly, the echo frequency may lie very near the reverberation frequency. In this case a very close spacing of filters at a frequency near the carrier frequency, and a much wider spacing of filters at frequencies further out from the carrier will provide a more efficient location system. The width of the pass-band of the filters is kept such as to always provide slightly overlapping passbands.

In one typical case in which 30 filters are used to cover a 300 cycle per second band, a filter at the carrier frequency has a bandwidth of 3 cycles per second, and the two filters at the extremes of the band each have bandwidths of 30 cycles per second. The filters in-between increase smoothly in bandwidth as their center frequency becomes further from the carrier frequency in such a way as to provide continuous frequency coverage. In this way the echo from a target having a range rate less than one-half knot could be well separated out from reverberation.

The outputs of the integrators 25 through 29 are applied to a commutator device 30. Commutator device 30 as shown in FIG. 1 is merely illustrative and may be an electronic scanning tube or can be a known mechanical commutator device. The function of device 30 is to scan the plurality of filter networks to produce an output indicative of the signals passing therethrough. As here exemplified, device 30 has a plurality of contacts, 31 through 36, the number of which corresponds to the number of filters employed plus an additional contact for keying a horizontal sweep generator 40, as hereinafter described. The output of integrator 25 is connected to contact 32, output of integrator 26 is connected to contact 33, integrator 27 to contact 34, integrator 28 to contact 35 and integrator 29 to contact 36. Each additional filter that may be employed in the system would be connected to a corresponding contact.

The commutating device 30 in operation rotates at a speed such as to completely scan all the filters at least once during a pulse length. In practice, a complete scan of all the filters is done many times during a pulse length. This is possible since all filtering and integration is done before the signals are commutated, hence the time constant of the circuits following the commutator can be as short as desired. Scanning rates as high as 200 complete scanning cycles per second can be used.

A signal appearing at any one of the contacts from the output of one of the filter sections accordingly will appear at the output line 37 of commutating device 30 which is connected to the intensifying grid 58 of cathode ray tube indicator 50.

Cathode ray tube indicator 50 is of a conventional design having a pair of horizontal deflection plates 56 and 57, a pair of vertical deflection plates 54 and 55 and an intensifying electrode 58. The electron beam of cathode ray tube indicator 50 is scanned in a vertical direction by saw tooth generator 23 through amplifier 24. Saw tooth generator 23 is also of conventional design and is keyed into operation synchronously with keying of driver 21 by keyer 22. Accordingly the time interval between each vertical sweep of the cathode ray tube indicator electron beam is proportional to the time interval between transmitted pulses. Through this means of jointly keying driver 21 and the vertical sweep generator 23 the vertical sweep of the electron beam may be calibrated to be indicative of the range of the detected remote object.

The electron beam of cathode ray tube indicator 50 is deflected horizontally by sweep generator 40, which may also be a saw tooth generator of conventional design and whose output is amplified by amplifier 41. Sweep generator 40 is operative to produce a horizontal sweep of the electron beam with the sweep length proportional in time to one revolution of commutating device 30. This is accomplished by connecting the above-mentioned additional contact 31 of commutating device 30 to the sweep generator 40. Sweep generator 40 may be self-starting in producing a sweep of the beam. Upon reaching contact 31, scanning device 30 imparts a voltage to sweep generator 40 that causes the sweep to fly back. There is thusly generated across the screen of cathode ray tube indicator 50 a series of horizontal sweeps each corresponding in time to one revolution of the scanning device 30.

It will be recalled that there is connected to the plurality of contacts of commutating device 30 the series of filters, each which passes a particular frequency. The output of commutating device 30, therefore may have a frequency above or below that of the transmitted frequency with its limits determined by the movement of the detected object. The output of commutating device 30 is coupled to the intensity grid 58 of cathode ray tube indicator 50 to intensify a bright spot in a horizontal position on the screen in accordance with the position of the contact arm of commutating device 30 and in a vertical position in accordance with its time of reception with respect to the transmitted pulse. Since each contact of commutating device 30 is connected to a particular filter each contact is representative of a particular frequency which is dependent on the movement of the detected object. It is readily apparent, then, that since the commutating device is synchronized with the horizontal sweep, the direction of movement of the object is imparted on the screen and shown by the position, left or right of center vertical sweep, of the intensified spot.

Of course, if the detected object is stationary there will be no Doppler shift and the reflected signals will be of the exact frequency as those transmitted. In turn only the center filter 15 will have a signal component impressed thereon to pass and hence there will be a voltage only on contact 34. Since contact 34 is exactly at the half-way point of the revolution of commutating device 30 the intensified spot will be in the center of the horizontal sweep. An intensified spot illustrated at B of screen 51 on the center of the horizontal sweep is therefore indicative of a stationary detected object.

If the detected object is moving in a direction away from the detecting apparatus the detected signals will be lower in frequency than that of the transmitted frequencies. In that instance only the filters having a center frequency lower than that of the transmitted pulse, will pass the signals, such as may be filters 13 and 14 which are connected through integrators 25 and 26 to contacts 31 and 32 of scanning device 30. There will be imparted accordingly, a signal to the intensifying electrode 58 of cathode ray tube indicator 50 at a time period somewhere during the first half of the horizontal sweep such as indicated at A on screen 51.

If the detected object is moving in a direction toward the detecting apparatus the detected signals will be higher in frequency than that of the transmitted frequency. In this instance only the filters having a center frequency higher than that of the transmitted pulse, will pass the signals, such as may be filters 16 and 17 connected through integrators 28 and 29 to contacts 35 and 36 of commutating device 30. There will be imparted then to intensifying electrode 58 of cathode ray tube indicator 50, a signal at a time period somewhere during the second half of the horizontal sweep such as indicated at C on screen 51.

The information presented on cathode ray tube screen 51 may be interpreted more readily by having a face plate 59 placed thereon having calibrations of range in the vertical direction and calibrations of Doppler shift or object movement in the horizontal direction. This face plate may be permanently impressed on the screen or may be of the transparent type mounted over the face of the screen, in a known manner.

Although I have shown only certain and specific embodiments of the present invention, it is to be expressly understood that many modifications are possible thereof without departing from the true spirit of the invention.

The invention described herein may be manufactured and used by or for the Government of the United States of America for government purposes without the payment of any royalties thereon or therefor.

What is claimed is:

1. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, frequency responsive means for separating said received reflected signals in accordance with the frequency thereof, indicating means and means for connecting the output of said frequency responsive means to said indicating means to indicate range and direction of movement of said object.

2. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, a plurality of band-pass filters coupled to the output of said receiver to separate said received reflected signals in accordance with the frequency thereof, indicating means and means for connecting the output of said plurality of band-pass filters to said indicating means to indicate range and direction of movement of said object.

3. A pulse echo system as set forth in claim 2, wherein each of said band-pass filters has a bandwith substantially equal to the reciprocal of the transmitted impulse duration.

4. A pulse echo system as set forth in claim 2, wherein one of said filters has a center frequency substantially equal to said predetermined frequency and a bandwidth substantially equal to the reciprocal of the transmitted impulse duration, and the remainder of said filters have center frequencies symmetrically disposed relative to the center frequency of said one filter and progressively different therefrom, with progressively greater bandwidths than said one filter.

5. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, a plurality of band-pass filters coupled to the output of said receiver to separate said received reflected signals in accordance with the frequency thereof, commutating means having a plurality of input contacts, a plurality of channels connecting each of said plurality of filters to a respective one of said contacts of said commutating means, and indicating means connected to the output of said commutating means to indicate range and direction of movement of said object.

6. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, frequency responsive means for separating said received reflected signals in accordance with the frequency thereof, rectifying and integrating means connected to said frequency responsive means for rectifying and integrating the output therefrom, indicating means and means for connecting said rectifying and integrating means to said indicating means to indicate range and direction of movement of said object.

7. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, a plurality of band-pass filters coupled to the output of said receiver to separate said received reflected signals in accordance with the frequency thereof, rectifying and integrating means connected to each of said plurality of band-pass filters for rectifying and integrating the outputs therefrom, indicating means and means for connecting said rectifying and integrating means to said indicating means to indicate range and direction of movement of said object.

8. A pulse echo system as set forth in claim 7, wherein each of said band-pass filters has a bandwidth substantially equal to the reciprocal of the transmitted impulse duration, and each of said integrating means have time constants substantially equal to the duration of the transmitted impulses.

9. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, frequency responsive means for separating said received reflected signals in accordance with the frequency thereof, rectifying and integrating means connected to each of said frequency responsive means for rectifying and integrating the outputs therefrom, commutating means having a plurality of input contacts and a rotatable contactor, a plurality of channels connecting each of said rectifying and integrating means to said plurality of contacts, and indicating means connected to the rotatable contactor of said commutating means to indicate range and direction of movement of said object.

10. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, frequency responsive means for separating said received reflected signals in accordance with the frequency thereof, cathode ray tube indicator means and means for connecting the output of said separating means to said indicating means to indicate range and direction of movement of said object.

11. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, frequency responsive means for separating said received reflected signals in accordance with the frequency thereof, commutating means connected to said last named means for scanning the output of said last named means many times during the interval between successive transmitted impulses, cathode ray tube indicator means, means operative to deflect the electron beam of said cathode ray tube indicator means in one direction synchronously with the transmission of each of said impulses, means operative synchronously with said commutating means to produce a straight line trace of the electron beam of said cathode ray tube indicator in a second direction at right angles to the first direction for each scanning cycle of said commutating means, and means applying the output of said commutating means to said cathode ray tube indicator means to indicate range and direction of movement of said object.

12. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, a plurality of band-pass filters for separating said received reflected signals in accordance with the frequency thereof, commutating means connected to said filters for scanning the output of said filters many times during the interval between successive transmitted impulses, cathode ray tube indicator means including an intensifying electrode, sawtooth generator means operative to deflect the electron beam of said cathode ray tube indicator means in one direction synchronously with the transmission of each of said impulses, sawtooth generator means operative synchronously with said commutating means to produce a straight line trace of the electron beam of said cathode ray tube indicator in a second direction at right angles to the first direction for each scanning cycle of said commutating means, and means applying the output of said commutating means to said intensifying electrode of said cathode ray tube indicator means to indicate range and direction of movement of said object.

13. A pulse echo signal locator system comprising: a transmitter for transmitting periodic impulses of a predetermined frequency to remote objects, a receiver for receiving said transmitted impulses after reflection from a remote object, said reflected signals deviating in frequency above or below said predetermined frequency in dependency of the movement of said object, a plurality of band-pass filters for separating said received reflected signals in accordance with the frequency thereof, commutating means having a plurality of contacts of a number in accordance with the number of said filters plus an additional contact, said commutating means further including a rotatable output contactor for scanning said contacts many times during the interval between successive transmitted impulses, a plurality of channels connecting each of said filters to one of said contacts; cathode ray tube indicator means including an intensifying electrode, sawtooth sweep generator means operative synchronously with the transmission of said impulses to deflect the electron beam of said cathode ray tube indicator means in one direction, a second sawtooth generator means for deflecting the electron beam of said cathode ray tube indicator in a second direction at right angles to said one direction, means for connecting said additional contact of said commutating means to said second sawtooth generator to trigger said second sawtooth generator into operation once each cycle of rotation of the rotatable contactor of said commutating means, and means for applying the output of said commutating means to said intensifying electrode of said cathode ray tube indicator means to indicate range and direction of movement of said object.

References Cited in the file of this patent

UNITED STATES PATENTS

| | | |
|---|---|---|
| 2,193,361 | Rice | Mar. 12, 1940 |
| 2,422,134 | Sanders | June 10, 1947 |